Dec. 15, 1959 J. S. BAER ET AL 2,917,331
MEANS FOR SECURING RELATIVELY MOVABLE MEMBERS
Filed March 27, 1956
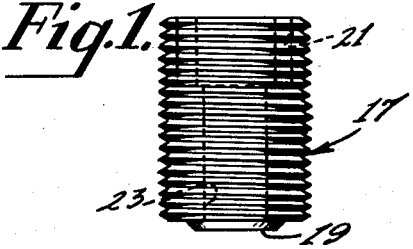
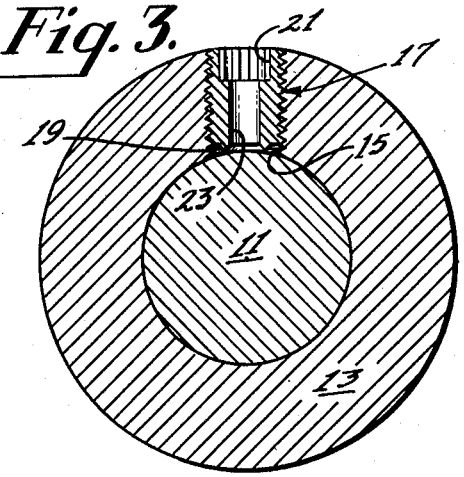
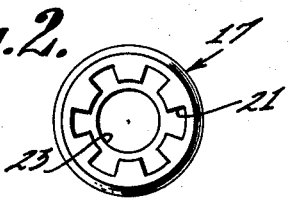
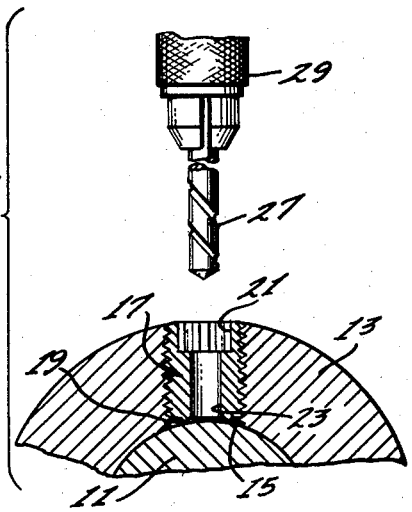
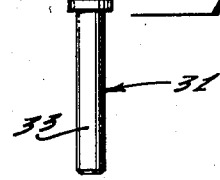
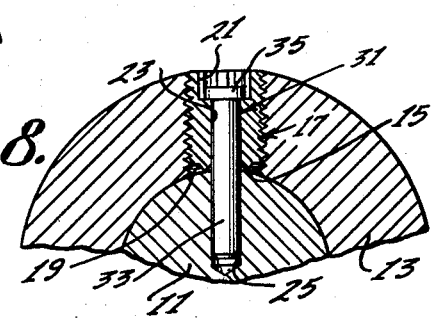
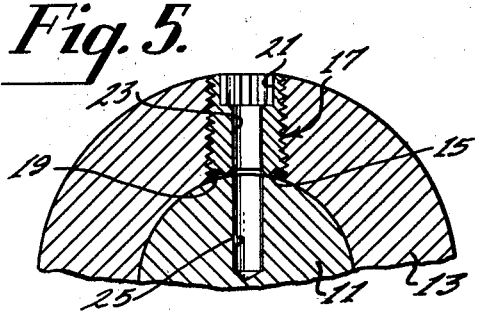
INVENTORS.
John S. Baer &
Robert D. Grapes
BY
ATTORNEY.

United States Patent Office 2,917,331
Patented Dec. 15, 1959

2,917,331

MEANS FOR SECURING RELATIVELY MOVABLE MEMBERS

John S. Baer, and Robert D. Grapes, Woodbury, N.J., assignors to Radio Corporation of America, a corporation of Delaware Application March 27, 1956, Serial No. 574,205

4 Claims. (Cl. 287—52.08)

This invention relates to means for securing relatively movable parts in a predetermined definite relationship, and more particularly to a novel set screw assembly for securing a member in a definite angular position on another member which is circular in cross section.

An object of this invention is to provide an improved securing assembly wherein a locking member serves as a part of a pinning assembly.

A further object of this invention is to provide an improved pinning assembly wherein a set screw locks the members, acts as a drill guide for drilling a pinning aperture, and supports the pin which locks the members.

A still further object of this invention is to provide an improved pinning assembly wherein the pin is readily removable from the assembly without mutilation of the parts.

A securing means, in accordance with the present invention, comprises the assembly of a set screw having a bore extending axially through it, and a pin member supported within the bore. A portion of the set screw bore is in the form of a tool socket. The remaining portion of the bore is in a form suitable to serve as a drill guide. The set screw is used in a conventional manner to lock the parts in a predetermined position. The set screw is then used as a drill guide for drilling a hole into one of the members. The pin member is then inserted through the set screw into the hole to positively secure the two members against relative movement.

The novel features of the invention, as well as additional objects and advantages thereof, will be understood more fully from the following description when read in connection with the accompanying drawing, in which;

Figure 1 is a view in elevation of a set screw of this invention having an axially extending bore, a portion of which forms a spline socket;

Figure 2 is a top view of the set screw of Figure 1 showing the spline socket;

Figure 3 is a sectional view of a shaft and collar locked together by the set screw of Figure 1;

Figure 4 shows a fragmentary sectional view of the assembly of Figure 3 and a portion of a drill head aligned with the set screw;

Figure 5 shows a fragmentary sectional view of the assembly of Figure 3, the shaft having a hole drilled partially into it;

Figure 6 is a view in elevation of a pin for pinning the collar and shaft;

Fig. 7 is a top view of an alternative form of pin showing a spline head; and

Figure 8 is a fragmentary sectional view of the assembly of Figure 3 including the pin of Figure 6.

Referring now in more detail to the accompanying drawing, the assembly will be described with reference to a shaft 11 and a collar 13 which is to be pinned to the shaft. These parts are shown and described merely by way of illustration, as it is apparent that the assembly may be used for pinning a great variety of relatively movable parts.

The collar 13 is provided with a radial aperture 15 which is tapped in a conventional manner to receive a set screw 17. The set screw 17, shown particularly in Figures 1 and 2, may have a projecting circular rib 19 at one end which is V-shaped in cross section. This rib permits the set screw to bite into the shaft 11 to aid in locking the members. The set screw 17 is provided with a bore extending completely through it in an axial direction. This bore is comprised of two portions. A socket portion 21 extends into the set screw from the end opposite the rib 19 and is in the form of a spline socket. Any suitable socket configuration will suffice. The portion 21 will be referred to as the socket. The remaining portion of the bore, which will be referred to as the bore 23, is preferably circular in cross section and is of smaller diameter than the smallest diameter of the socket 21. The set screw is threaded into the tapped collar opening 15 to lock the collar to the shaft, after these latter members have been accurately located with respect to each other in a conventional manner. Location of the parts may involve a mechanism timing operation.

Referring now particularly to Figures 4 and 5 of the drawing, a hole 25 is drilled into the shaft 11 through the bore 23 of the set screw 17 which the shaft 11 and collar 13 are locked together. In performing this step, the bore 23 of the set screw acts as a drill guide or drill bushing for a drill 27 which is supported in a drill holder or head 29. The hole 25 then has substantially the same diameter as the bore 23 of the set screw.

A pin 31 for pinning the members 11 and 13 is shown in Figure 6 and comprises a shank 33 and a head 35. The shank 33 of the pin has a diameter substantially the same as the diameter of the bore 23 and the hole 25. The pin 31 is preferably provided with a round head which is of a diameter slightly larger than the smallest cross sectional diameter of the socket 21. This is desirable so that the head 35 must be forced into the socket when the pin is inserted into the assembly. The head of the pin will then be anchored firmly within the socket and will prevent loosening of the pin within the assembly due to vibration, for example. Alternatively, the pin 31 may be formed from splined key stock which has been partially turned down whereby the head 35 would have the spline configuration shown in Figure 7. With this configuration, it is again desirable that the head 35 be of slightly larger dimension than the socket 21 to provide a force fit between the head and the socket.

When the pin is inserted within the assembly, as shown in Figure 8, the head 35 of the pin seats within the spline socket 21 of the set screw and the head rests on the shoulder formed between the socket 21 and the bore 23 of the set screw. The depth of the head 35 is substantially less than the depth of the socket 21 so that sufficient socket depth is available, after the pin is inserted, to engage the set screw with a wrench or tool. This is necessary so that the pin can be removed by removing the set screw in a conventional manner. The shank 33 of the pin extends through the bore 23 of the set screw and into the hole 25 of the shaft. The set screw 17 remains intact within the collar and forms an integral part of the collar insofar as the pinning between the collar and the shaft is concerned.

A particular feature of the above described pinning assembly is that the pin may be readily removed from the shaft merely by removing the set screw in a conventional manner. This may be done without mutilating any of the parts.

The use of the above described pinning assembly provides a number of advantages over the conventional straight or tapered pin application. No special machining accuracy is required, such as reaming for the pin, Only reasonable accuracy is required to permit efficient operation of the assembly, and this accuracy is inherent in the assembly. The drilling tool may be brought to the work for drilling the pinning hole. When the parts to be pinned are once timed, the pinning hole is drilled and the pin inserted without disturbing the timing.

What is claimed is:

1. A pinned assembly comprising, in combination, a pair of members intended to be held against relative movement, one of said members having a threaded aperture communicating with the other of said members, a set screw threaded into said aperture to lock said members, said set screw having a cylindrical bore extending axially therethrough, said bore including a socket at its end away from said other member, said other member having a hole aligned with the bore of said set screw, and a headed pin member of cylindrical form extending through said bore and into said hole, the head of said pin being dimensioned for a force fit with said socket and being seated within said socket.

2. A pinned assembly comprising the combination of a shaft, a member carried on said shaft to be held against rotation with respect to said shaft, said member having a threaded aperture communicating with said shaft, a set screw disposed in said threaded aperture, said set screw having a cylindrical axial bore including a socket portion and a drill guide portion, said drill guide portion being disposed adjacent said shaft, said shaft having a hole in axial alignment with said drill guide portion, and a headed pin of cylindrical form disposed in said aligned hole and drill guide portion to lock said shaft and said member against relative rotation, the head of said pin engaging the socket portion of said set screw in a force fit relationship.

3. A pinning assembly for securing a pair of members intended to be held against relative movement and one of which has a threaded aperture therethrough, said assembly comprising an externally threaded set screw adapted to be threaded in said aperture, said set screw having a cylindrical axial bore extending therethrough, said bore including a socket portion at one end and a drill guide portion at the other end, said set screw being adapted to act as a drill guide for reception of a drill adapted to form a hole in the other of said members, and a cylindrical pin member having a head and a shank, said shank having substantially the same cross sectional diameter as said drill guide portion, said head being dimensioned to seat in said socket portion in a force fit relationship, and said shank extending through said drill guide portion and beyond the end of said set screw for reception in said hole.

4. A clamping screw and locking pin combination for clamping and locking a part in position on a member, said clamping screw having a cylindrical central bore, said bore being enlarged at one end of said clamping screw, said locking pin being of cylindrical form and having an elongated shank slidably receivable in said bore, said locking pin having a radially enlarged head, the axial dimension of said head being less than the axial dimension of said enlargement of said bore in said screw whereby to provide clearance in said enlargement for a tool when said head is received in said enlargement, and said shank having an axial length greater than said bore exclusive of said enlargement thereof.

References Cited in the file of this patent

UNITED STATES PATENTS

| 2,532,815 | Kindsvatter | Dec. 5, 1950 |
| 2,553,337 | Shafer | May 15, 1951 |